US006166310A

United States Patent [19]

Carter

[11] Patent Number: 6,166,310

[45] Date of Patent: Dec. 26, 2000

[54] WATER ACTIVATED CHIMING DEVICE

[76] Inventor: Raymond M. Carter, 263 E. Strand, Kingston, N.Y. 12401

[21] Appl. No.: 09/438,281

[22] Filed: Nov. 12, 1999

[51] Int. Cl.[7] .......... G01D 13/08

[52] U.S. Cl. .......... 84/402; 116/141; 116/169; 340/392.1; 340/398.1

[58] Field of Search .......... 84/402; 116/141, 116/169; 340/392.1, 392.2, 396.1, 397.3, 398.1

[56] References Cited

U.S. PATENT DOCUMENTS 5,520,089 5/1996 Prentiss .......... 84/330

*Primary Examiner*—David Martin
*Assistant Examiner*—Shih-yung Hsieh
*Attorney, Agent, or Firm*—Charles J. Brown

[57] ABSTRACT

A water activated chiming device wherein a clapper floats on a stream of water spiraling upwardly out of an open upper end of a vertical pipe so that the clapper is randomly turned and moved laterally by the water to strike adjacent chime elements.

9 Claims, 2 Drawing Sheets

WATER ACTIVATED CHIMING DEVICE

BACKGROUND OF THE INVENTION

Outdoor chimes are most commonly activated by wind which moves a clapper in a random or fixed fashion to strike chime elements. A variation is to have the clapper driven by electromechanical means as described for example in U.S. Pat. No. 5,072,208. It has been known to activate a clapper driving mechanism by solar or light energy as described in U.S. Pat. Nos. 5,208,578 and 5,369,391. It has also been proposed that the clapper be made to move and strike chimes by human power as in U.S. Pat. No. 2,770,159, and even by animal power as in U.S. Pat. No. 2,296,006.

It is the principal purpose of the present invention to depart from all of these earlier designs and activate a chiming device by means of flowing water. It is also a purpose of the invention to produce randomness in the striking of chimes operated by flowing water.

SUMMARY OF THE INVENTION

The water activated chiming device of the invention includes a substantially vertical pipe having a horizontal upper end with a horizontal opening therein. Pumping apparatus is included for flowing water up through the pipe. Flow diverting means direct the flowing water in a helical upward path so that it then spirals out over the upper end of the pipe and falls away. A clapper is adapted to float on and be turned and moved laterally by the water spiraling out from the upper end opening of the pipe. At least one chime element is suspended alongside the pipe and is adapted to be struck randomly by the turning and laterally moving floating clapper.

In a preferred form of the device a cam is fixed to the underside of the clapper to extend downwardly through the upper end opening of the pipe to limit lateral movement of the clapper away from the center of the pipe upper end opening. A hub may encircle the upper end of the pipe to define the upper end opening.

The flow diverting means may be a stator element fixed within the pipe adjacent the upper end opening thereof. The stator element preferably defines a plurality of apertures with angled surfaces through which the water flows in a helical upward path.

In a preferred form of the apparatus the pipe is vertical and its cross section is circular. The clapper periphery may be other than circular preferably with a plurality of straight sides.

A water reservoir may be included beneath the lower end of the pipe with the pumping apparatus located in the reservoir.

DESCRIPTION OF A PREFERRED EMBODIMENT

Figure 1:
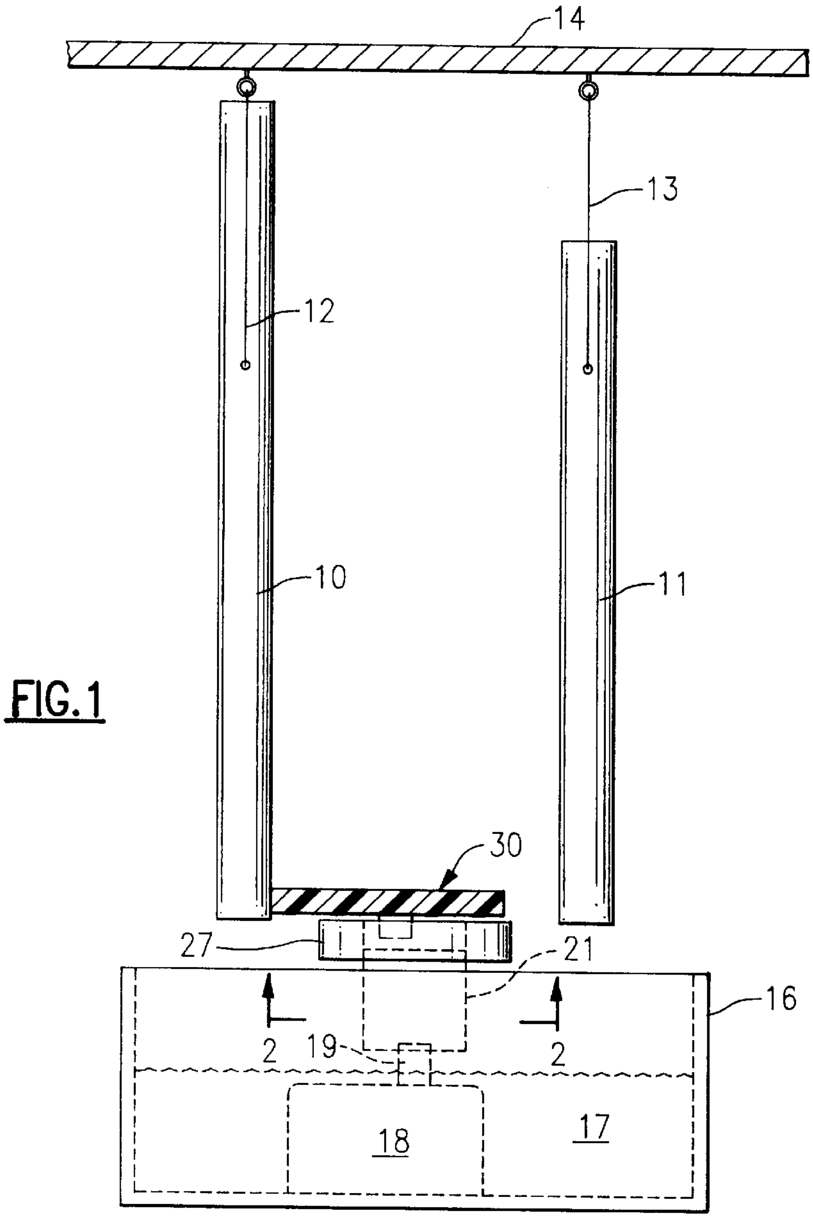
FIG. 1 is an elevation of the chiming device of the invention in which a clapper strikes chime elements at their lower end portion.

Referring first to FIG. 1 chimes 10 and 11 are suspended in the usual fashion by cords 12 and 13 from an upper frame element 14. The chimes 10 and 11 are typically cylindrical in shape and of metal and one may be longer than the other so that they emit markedly different tones. More than two such chime elements may be employed in which case all of them should be arranged equidistantly from a central centerline parallel to the axes of them all.

The purpose of the invention is to provide means for striking these chime elements in succession and randomly, and to do so using flowing water as the driving medium.

Figure 2:
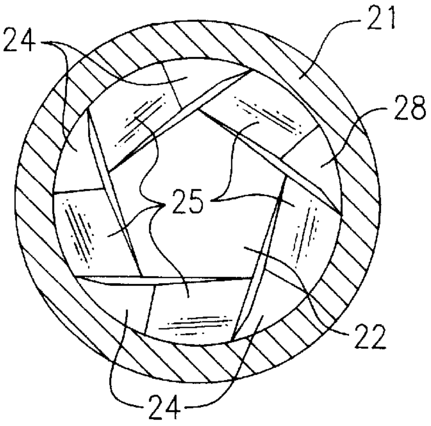
FIG. 2 is a section taken along the line 2—2 of FIG. 1.

To accomplish this an open top container 16 of water 17 is located below the chimes 10 and 11 generally coaxial with the central centerline of the chime elements. The container 16 may be circular in plan. Beneath the surface of the water 17 and resting on the bottom of the container 16 is a submersible electric water pump 18. A water outlet 19 of the pump 18 is directed upwardly into the closed bottom of a vertical pipe 21, the cross sectional shape of which is shown in FIG. 2 as circular both on its outside and inside. Water forced into the pipe 21 through the outlet 19 of the pump 18 rises and exits from the upper end of the pipe 21.

Figure 3:
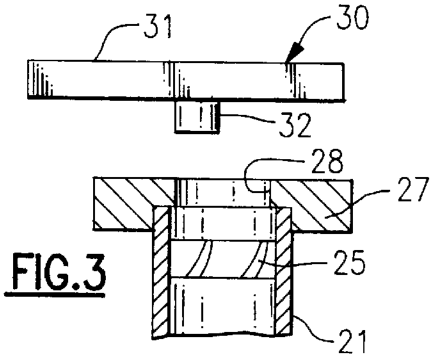
FIG. 3 is a fragmentary exploded view partly in section of all elements including the clapper at the upper end of the pipe.

In FIGS. 2 and 3 the components of the chiming device of the invention are shown at the upper end portion of the pipe 21. Rising water in the pipe 21 first encounters flow diverting means which is a stator element 22 fixed within the pipe 21 near the upper end thereof. It closes off all of the pipe interior except for five apertures 24 through which the upwardly flowing water is directed by respective angled baffle surfaces 25. Movement over those surfaces 25 causes the water to flow in a helical upward path in the pipe 21 after rising out of the stator element 22.

An annular hub 27 is fixed on the upper end of the pipe 21. It defines a central circular opening 28 which is concentric with and substantially the same diameter as the inside diameter of the pipe 21. Water rising helically in the pipe 21 from the stator element 22 ascends through the opening 28 in the hub 27. That opening 28 and the complete upper annular surface of the hub 27 are horizontal and flat. Therefore the helically rising water spirals out in a thin continuous layer over the hub 27 and falls over the periphery of the hub 27 down to the water 17 in the container 16.

Figure 4:
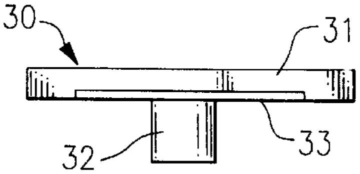
FIG. 4 is a side elevation of the clapper.
Figure 5:
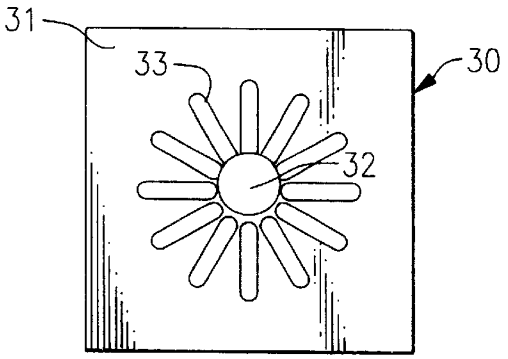
FIG. 5 is a plan view of the underside of the clapper.

Floating on this thin continuous layer of water which spirals out over the hub 27 is a clapper 30 shown particularly in FIGS. 3 to 5. The term "floating" is used herein in the broadest sense to mean that the clapper 30 remains separated by a thin layer of water from contact with the surface of the hub 20. Because of relative motion between the clapper 30 and the water layer beneath it, the clapper 30 typically hydroplanes on the water without sinking into contact with the surface of the hub 27. Therefore the term "floating" is not limited to the clapper 30 being so light in weight that it is buoyant in water. The clapper 30 has a body 31 of square outline in the underside plan view as shown in FIG. 5. A circular post forming a cam 32 extends downwardly from the center of the body 31 of the clapper 30 into the opening 28 in the hub 27. A radial array of grooves 33 is formed in the underside of the body 31.

In the operation of the chime device of FIGS. 1 to 5 water is directed upwardly through the pipe 21 by the pump 18 and is given a helical path of flow as it rises through the stator element 22. The water then spills out in a spiral flow over the upper surface of the hub 27 and falls back down into the container 16. In the broad sense of the word "floating" as defined above, the clapper 30 floats on the water spiralling out over the hub upper surface and the radial grooves 33 on the underside of the body 31 of the clapper 30 engage the spiralling flow of water to impart rotation to the clapper 30. As it rotates the clapper 30 moves randomly away from the centerline of the pipe 21 but such movement is checked by contact of the cam 32 on the clapper 30 with the inside of the opening 28 in the hub 27. The corners of the square body 31 of the clapper 30 randomly strike the chime elements 10 and 11 as the clapper 30 turns on spiraling water over the hub 27 and moves randomly toward and away from the centerline of the pipe 21 restrained only by the cam 32 extending down into the opening 28 in the hub 27.

Figure 6:
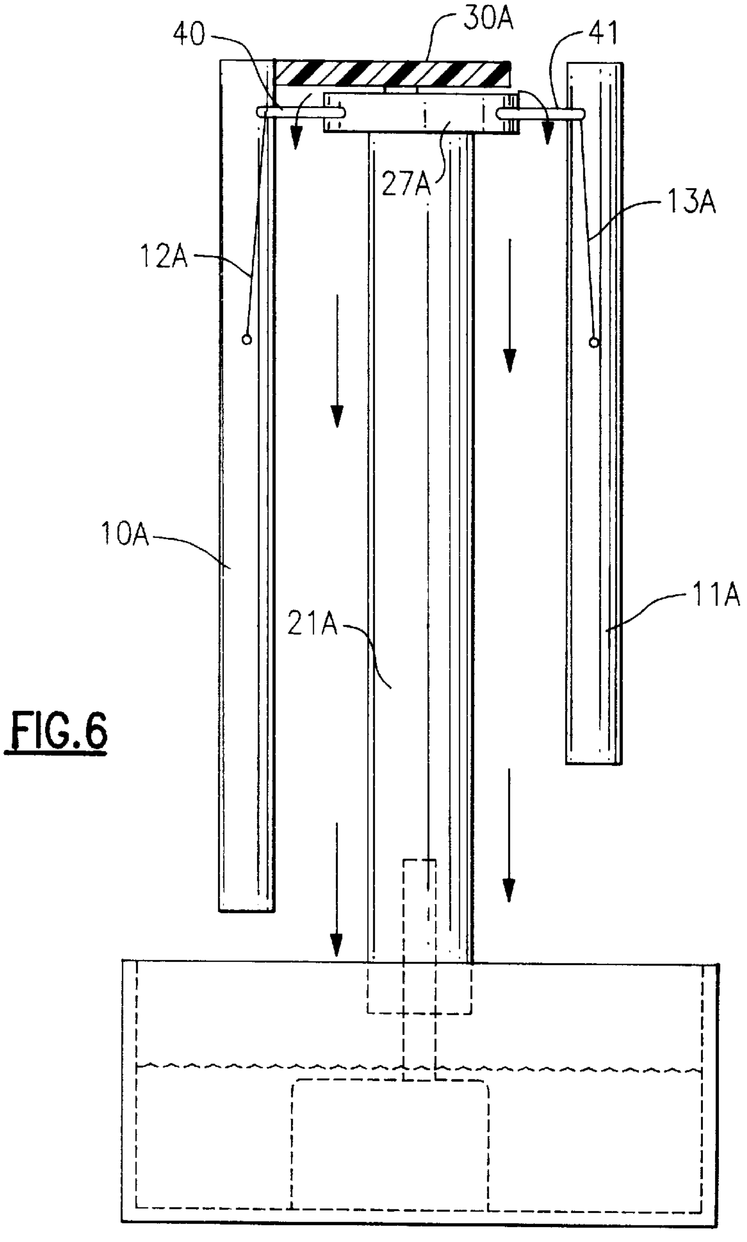
FIG. 6 is an elevation of another embodiment of the chiming device of the invention in which the clapper strikes chime elements at their upper end portion.

A variation of the invention is shown in FIG. 6. All parts of the chiming device are similar to those of the embodiment of FIGS. 1 to 5 except that the clapper 30A and its associated components are at the upper end of a longer form of the pipe 21A. The consequence is that the clapper 30A strikes the upper ends of the chimes 10A and 11A rather than lower ends of such chimes as in the embodiment of FIGS. 1 to 5. Rather than suspending the chimes from an upper frame, the chimes 10A and 11A may be suspended by their cords 12A and 13A from brackets 40 and 41 extending out from the hub 27A. The mode of operation of the embodiment of FIG. 6 is substantially the same as that of the embodiment of FIGS. 1 to 5 except that the clapper strikes the upper rather than the lower ends of the chime elements.

The scope of the invention is to be determined by the following claims rather than by the foregoing description of a preferred embodiment.

What is claimed is:

1. A water activated chiming device comprising a) a substantially vertical pipe having a horizontal upper end with a horizontal opening therein, b) pumping apparatus for flowing water up through said pipe, c) flow diverting means for directing the flowing water in a helical upward path so that it then spirals out over the upper end of the pipe and falls away, d) a clapper adapted to float on and be turned and moved laterally by the water spiraling out from the upper end opening of the pipe, and e) at least one chime element suspended alongside said pipe and adapted to be struck randomly by the turning and laterally moving floating clapper.

2. A water activated chiming device according to claim 1 wherein a cam fixed to the underside of the clapper extends downwardly through the upper end opening of the pipe to limit lateral movement of the clapper away from the center of the pipe upper end opening.

3. A water activated chiming device according to claim 1 wherein a hub encircles the upper end of the pipe and defines its upper end opening.

4. A water activated chiming device according to claim 1 wherein the flow diverting means is a stator element fixed within the pipe adjacent the upper end opening thereof, the stator element defining a plurality of apertures with angled surfaces through which the water flows in a helical upward path.

5. A water activated chiming device according to claim 1 wherein the pipe is vertical.

6. A water activated chiming device according to claim 1 wherein the cross section of the pipe is circular and the clapper periphery is other than circular.

7. A water activated chiming device according to claim 6 wherein the clapper has a plurality of straight sides.

8. A water activated chiming device according to claim 1 which includes a water reservoir beneath the lower end of the pipe and said pumping apparatus is located in the reservoir.

9. A water activated chiming device comprising a) a vertical pipe open at its upper end, b) a hub encircling the upper end of the pipe to define a horizontal upper end with a horizontal opening therein, c) a water reservoir at the lower end of the pipe, d) pumping apparatus in the reservoir for flowing water up through the pipe, e) a stator element fixed within the pipe adjacent the upper end thereof and defining a plurality of apertures with angled surfaces through which the water flows in a helical upward path so that it then spirals out from the horizontal opening in the hub and over the horizontal upper end of the hub and falls to the reservoir along the exterior of the pipe, f) a clapper having a periphery other than circular adapted to float on and be turned and moved laterally by the water spiraling out over the upper end of the hub, g) a cam fixed to the underside of the clapper and extending downwardly through the opening in the hub to limit random movement of the clapper away from the center of the hub, and h) chime elements suspended alongside said tube and adapted to be struck randomly by the turning and laterally moving floating clapper.

* * * * *